United States Patent
Haberman et al.

(10) Patent No.: US 10,834,774 B1
(45) Date of Patent: Nov. 10, 2020

(54) SYSTEM AND METHOD FOR INDICATING COVERAGE TYPES FOR USER DEVICES IN DUAL CONNECTIVITY WIRELESS NETWORKS

(71) Applicant: Verizon Patent and Licensing Inc., Arlington, VA (US)

(72) Inventors: Michael Haberman, Morristown, NJ (US); Michael A. Lombardo, Bethlehem, PA (US); Andrew E. Youtz, Princeton, NJ (US); Tajas Bhavsar, Stewartsville, NJ (US); Christopher M. Mullen, Nazareth, PA (US); Raafat Edward Kamel, Little Falls, NJ (US); Balaji L. Raghavachari, Bridgewater, NJ (US); Lily Zhu, Parsippany, NJ (US); Esneyder Ospina, Dallas, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 16/451,715

(22) Filed: Jun. 25, 2019

(51) Int. Cl.
*H04W 76/38* (2018.01)
*H04W 76/15* (2018.01)
*H04W 16/32* (2009.01)
*H04W 76/18* (2018.01)

(52) U.S. Cl.
CPC .......... *H04W 76/15* (2018.02); *H04W 16/32* (2013.01); *H04W 76/18* (2018.02); *H04W 76/38* (2018.02)

(58) Field of Classification Search
CPC ................. H04B 7/2121; H04B 7/2123; H04J 2203/0069; H04Q 2213/394; H04W 72/04; H04W 72/12; H04W 76/00
USPC ......................................................... 370/329
See application file for complete search history.

(56) References Cited

U.S. PATENT DOCUMENTS

| | | | |
|---|---|---|---|
| 2019/0394691 A1* | 12/2019 | Shih .................. | H04W 36/0072 |
| 2020/0022202 A1* | 1/2020 | Guha ........................ | H04W 76/16 |
| 2020/0045762 A1* | 2/2020 | Raghuram ............ | H04W 76/16 |
| 2020/0045764 A1* | 2/2020 | Kim ....................... | H04W 76/19 |
| 2020/0059395 A1* | 2/2020 | Chen ...................... | H04W 24/10 |
| 2020/0059991 A1* | 2/2020 | Wu ........................ | H04W 76/15 |
| 2020/0137819 A1* | 4/2020 | Shi ......................... | H04W 76/19 |
| 2020/0163144 A1* | 5/2020 | Ryoo .................... | H04W 76/16 |
| 2020/0169925 A1* | 5/2020 | Li ........................... | H04W 36/08 |
| 2020/0187301 A1* | 6/2020 | Park ........................ | H04L 67/14 |

* cited by examiner

*Primary Examiner* — Robert J Lopata

(57) ABSTRACT

Systems and methods described herein improve a customer experience for non-standalone celular networks by displaying a secondary cell group (SCG) network icon after data activity ends while a user device likely remains in SCG coverage. When connected to the SCG, the user device detects inactivity on the connection and initiates a first timer, based on the detecting, while continuing to present an SCG-related icon. If the first timer expires while the user device is in an idle state, the user device initiates a second timer, while continuing to present the SCG-related icon. If the user device detects an active connection before expiration of the second timer, the user device initiates a third timer while continuing to present the SCG-related icon. If the user device fails to detect a connection to the SCG before expiration of the third timer, a master cell group (MCG)-related icon is displayed.

20 Claims, 10 Drawing Sheets

SYSTEM AND METHOD FOR INDICATING COVERAGE TYPES FOR USER DEVICES IN DUAL CONNECTIVITY WIRELESS NETWORKS

BACKGROUND

Long Term Evolution (LTE) is a mobile telecommunications standard for wireless communications involving mobile user equipment, such as mobile devices and data terminals. LTE networks include existing Fourth Generation (4G) and 4.5 Generation (4.5G) wireless networks. Next Generation mobile networks, such as Fifth Generation (5G) mobile networks, are being deployed as the next evolution of mobile wireless networks. 5G mobile networks are designed to increase data transfer rates, increase spectral efficiency, improve coverage, improve capacity, and reduce latency.

While 5G networks are being deployed and evolving, 5G devices need to be supported in legacy networks, such as LTE networks. User devices associated with a 5G New Radio (NR) system may have the capability to communicate via a 5G network, as well as communicate via other networks, such as an LTE-based network. For example, an Evolved Universal Terrestrial Radio Access New Radio Dual Connectivity (EN-DC) device has the capability to exchange data with an LTE base station (e.g., an eNodeB), as well as exchange data with a 5G next generation base station (e.g., a gNodeB). The 5G and LTE base stations may have different and/or overlapping coverage areas where signals from multiple base stations can be simultaneously detected by a user device.

DETAILED DESCRIPTION OF THE PREFERRED EMBODIMENTS

Figure 1:
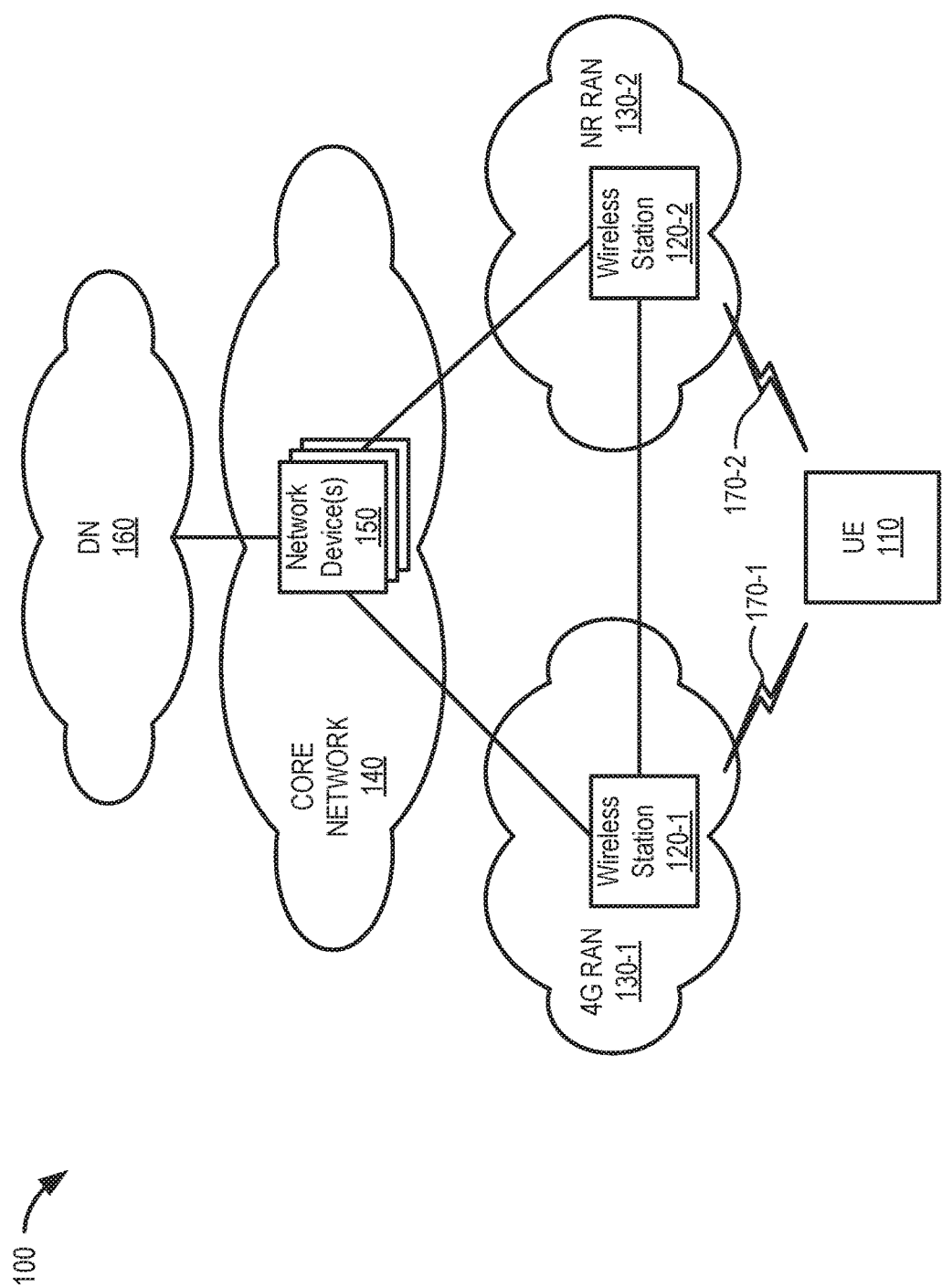
FIG. 1 is a diagram illustrating a network environment in which systems and methods described herein may be implemented.

The following detailed description refers to the accompanying drawings. The same reference numbers in different drawings may identify the same or similar elements. Also, the following detailed description does not limit the invention.

As Fifth Generation (5G) networks are being rolled out, networks and user equipment (UE) are being configured to connect to both 5G radio access networks (RANs) and 4G RANs, such as an Evolved Universal Mobile Telecommunications System (UMTS) Terrestrial Radio Access Network (E-UTRAN) of a Long Term Evolution (LTE) network. In these dual-coverage networks, referred to as Non-Standalone (NSA) networks, 5G-capable UE devices need to be supported with 4G networks because of coverage reasons (e.g., limited coverage areas of 5G RANs), feature support (e.g., features, such as voice-over-LTE, that rely on 4G), and/or certain handover requirements. In NSA networks, generally UE devices first connect to a master cell group (MCG) before connecting to a secondary cell group (SCG) when 5G coverage is available. The master cell group supports 4G connections (such as LTE connections), while the secondary cell group supports 5G connections (such as 5G NR connections). When in idle mode, the UE device listens over the master cell group, and only connects to the secondary cell group when actively passing data.

UE devices typically display an icon (referred to herein as a "network icon") that indicates the current type of network service. For example, the UE device may display a MCG-related network icon (e.g., a "4G" icon) when connected to a master cell group and may display a SCG-related network icon (e.g., a "5G" icon) when connected to a secondary cell group. Although these network icons accurately reflect the type of network service for an active network connection, network icons are typically perceived by users as an indicator of network coverage even when the UE device does not have an active connection. Because a UE device in an NSA network defaults to listen over the 4G RAN (e.g., the master cell group) when not actively passing data, the UE device may present a "4G" network icon when the UE device is idle in a 5G NR coverage area.

Systems and methods described herein improve customer experience by having the UE device display a 5G network icon after 5G data activity ends (e.g., by radio link failure or proper conclusion of data transmission) instructions in which the UE device likely remains in 5G coverage. According to an implementation, when connected to a secondary cell group that provides 5G service, the UE device may detect inactivity on the connection and may initiate a first timer, based on the detecting, while continuing to present an SCG-related icon. If the first timer expires while the UE device is in an idle state, the UE device may initiate a second timer, while continuing to present the SCG-related icon. If the UE device detects an active connection before expiration of the second timer, the UE device may initiate a third timer while continuing to present the SCG-related icon. If the UE device fails to detect a connection to the SCG before expiration of the third timer, a MCG-related icon may be displayed.

FIG. 1 is a diagram of an exemplary environment 100 in which the systems and/or methods, described herein, may be implemented. Referring to FIG. 1, environment 100 includes UE device 110, a wireless station 120-1 associated with a RAN 130-1, a wireless station 120-2 associated with a RAN 130-2, a core network 140 with network devices 150, and a data network (DN) 160. Wireless stations 120-1 and 120-2 may be referred to herein collectively as wireless stations 120 and individually as wireless station 120 or 120-X, and RANs 130-1 and 130-2 may be referred to herein collectively as RANs 130 and individually as RAN 130 or 130-X. In other embodiments, environment 100 may include additional networks, fewer networks, and/or different types of networks than those illustrated and described herein.

Environment 100 includes links between the networks and between the devices. Environment 100 may be implemented to include wired, optical, and/or wireless links among the devices and the networks illustrated. A communication connection via a link may be direct or indirect. For example, an indirect communication connection may involve an intermediary device and/or an intermediary network not illustrated in FIG. 1. Additionally, the number and the arrangement of links illustrated in environment 100 are exemplary.

In the configuration of FIG. 1, UE device 110 may use wireless channels 170-1 and 170-2 (referred to collectively as wireless channels 170) to access wireless stations 120-1 and 120-2, respectively. Wireless channels 170 may correspond, for example, to physical layer protocols in accordance with different radio access technology (RAT) types. For example, wireless channel 170-1 may correspond to physical layer protocols for 4G or 4.5G RANs (e.g., 3GPP standards for 4G and 4.5G air interfaces, collectively referred to herein as "4G"), while wireless channel 170-2 may correspond to physical layer protocols for NR RANs (e.g., 3GPP standards for 5G air interfaces).

UE device 110 may include any type of mobile device having multiple coverage mode capabilities, and thus communicate with different wireless stations (e.g., wireless stations 120) using different wireless channels (e.g., channels 170) corresponding to the different RANs (e.g., RANs 130). UE device 110 may include, for example, a cellular radiotelephone, a smart phone, a tablet, any type of internet protocol (IP) communications device, a Voice over Internet Protocol (VoIP) device, a laptop computer, a wearable computer, a gaming device, a media player device, or a digital camera that includes communication capabilities. In other implementations, UE device 110 may be implemented as a machine-type communications (MTC) device, an Internet of Things (IoT) device, a machine-to-machine (M2M) device, etc. According to implementations described herein, UE device 110 may be provisioned (e.g., via a subscriber identity module (SIM) card or another secure element) to recognize particular network identifiers (e.g., associated with RANs 130) and to support particular radio frequency (RF) spectrum ranges. UE device 110 may support wireless communications using 5G, 4.5G, 4G, and other air interfaces. Additionally, UE device 110 may support simultaneous carrier aggregation of different RAT types (e.g., 4G and 5G NR).

Wireless stations 120 may each include a network device that has computational and wireless communication capabilities. Wireless stations 120 may each include a transceiver system that connects UE device 110 to other components of RAN 130 and core network 140 using wireless/wired interfaces. Wireless stations 120 may be implemented as a base station (BS), a base transceiver station (BTS), a Node B, an evolved Node B (eNodeB or eNB), an evolved LTE (eLTE) eNB, a next generation Node B (gNodeB or gNB), a remote radio head (RRH), an RRH and a baseband unit (BBU), a BBU, or other type of wireless node (e.g., a picocell node, a femtocell node, a microcell node, etc.) that provides wireless access to one of RANs 130. Each wireless station 120 may support a RAN 130 having different RAT types. For example, in one implementation, RAN 130-1 may include an E-UTRAN for an LTE network, while RAN 130-2 may include a 5G NR RAN. In another implementation, one or more of wireless stations 120 may support multiple RAN types. For example, RAN 130-2 may be configured to support communications via both LTE and 5G networks.

According to an implementation described herein, RAN 130-1 may serve as a master cell group (MCG) for a Non-Standalone (NSA) network in environment 100. Wireless station 120-1 for RAN 130-1 may use licensed RF spectrum for 4G networks. RAN 130-2 may serve as a secondary cell group (SCG) in which wireless station 120-2 (e.g., a gNodeB) provides 5G NR service using millimeter wave (mmWave) radio frequencies.

Core network 140 may include one or multiple networks of one or multiple types. For example, core network 140 may include a terrestrial network and/or a satellite network. According to an exemplary implementation, core network 140 includes a network pertaining to multiple RANs 130. For example, core network 140 may include the core part of an LTE network, an LTE-A network, a 5G network, a legacy network, and so forth.

Depending on the implementation, core network 140 may include various network elements that may be implemented in network devices 150. Such network elements may include a mobility management entity (MME), a user plane function (UPF), a session management function (SMF), a core access and mobility management function (AMF), a unified data management (UDM), a PDN gateway (PGW), a serving gateway (SGW), a policy control function (PCF), a home subscriber server (HSS), as well other network elements pertaining to various network-related functions, such as billing, security, authentication and authorization, network polices, subscriber profiles, network slicing, and/or other network elements that facilitate the operation of core network 140. As described further herein, in the context of a 4G network that is configured to support 5G UEs, core network 140 may include one or more network devices 150 with combined 4G and 5G functionality, such as a session management function with PDN gateway-control plane (SMF+PGW-C) and a user plane function with PDN gateway-user plane (UPF+PGW-U).

DN 160 may include one or more networks, such as a local area network (LAN), a wide area network (WAN), a metropolitan area network (MAN), a telephone network, the Internet, etc., capable of communicating with UE device 110. In one implementation, PDN 160 includes a network that provides data services (e.g., via packets or any other Internet protocol (IP) datagrams) to UE device 110.

The number and arrangement of devices in environment 100 are exemplary. According to other embodiments, environment 100 may include additional devices and/or differently arranged devices, than those illustrated in FIG. 1.

As described above, in an exemplary implementation, UE device 110 is an EN-DC device capable of communicating via a 4G network (e.g., an LTE network), as well as via a 5G network. According to standards for NSA networks, a 4G cell (e.g., RAN 130-1 using wireless station 120-1) may serve as master cell group, and a 5G NR cell (e.g., RAN 130-2 using wireless station 120-2) may serve as a secondary cell group when available.

FIGS. 2A-2D are diagrams illustrating exemplary cell coverage areas in an area 200 of environment 100. Referring to collectively to FIGS. 2A-2D, area 200 includes a 4G cell 210 overlapping multiple 5G cells 220-1, 220-2 and 220-3 (referred to herein collectively as 5G cells 220). Each of cells 210-220 may correspond to a particular coverage supported by a particular wireless station 120. In an exemplary implementation, cell 210 may correspond to LTE-based cell having a relatively large coverage area supporting LTE communications devices that operate in a particular frequency. Each of cells 220 may correspond to a 5G NR cell that has a smaller coverage area than cell 210 and operates in a different frequency band than cell 210.

UE devices 110 may present network icons 202 that indicate a current type of network service for UE device 110. Assume that UE devices 110 may move within the area of 4G cell 210 and between 5G cells 220.

Figure 2A:
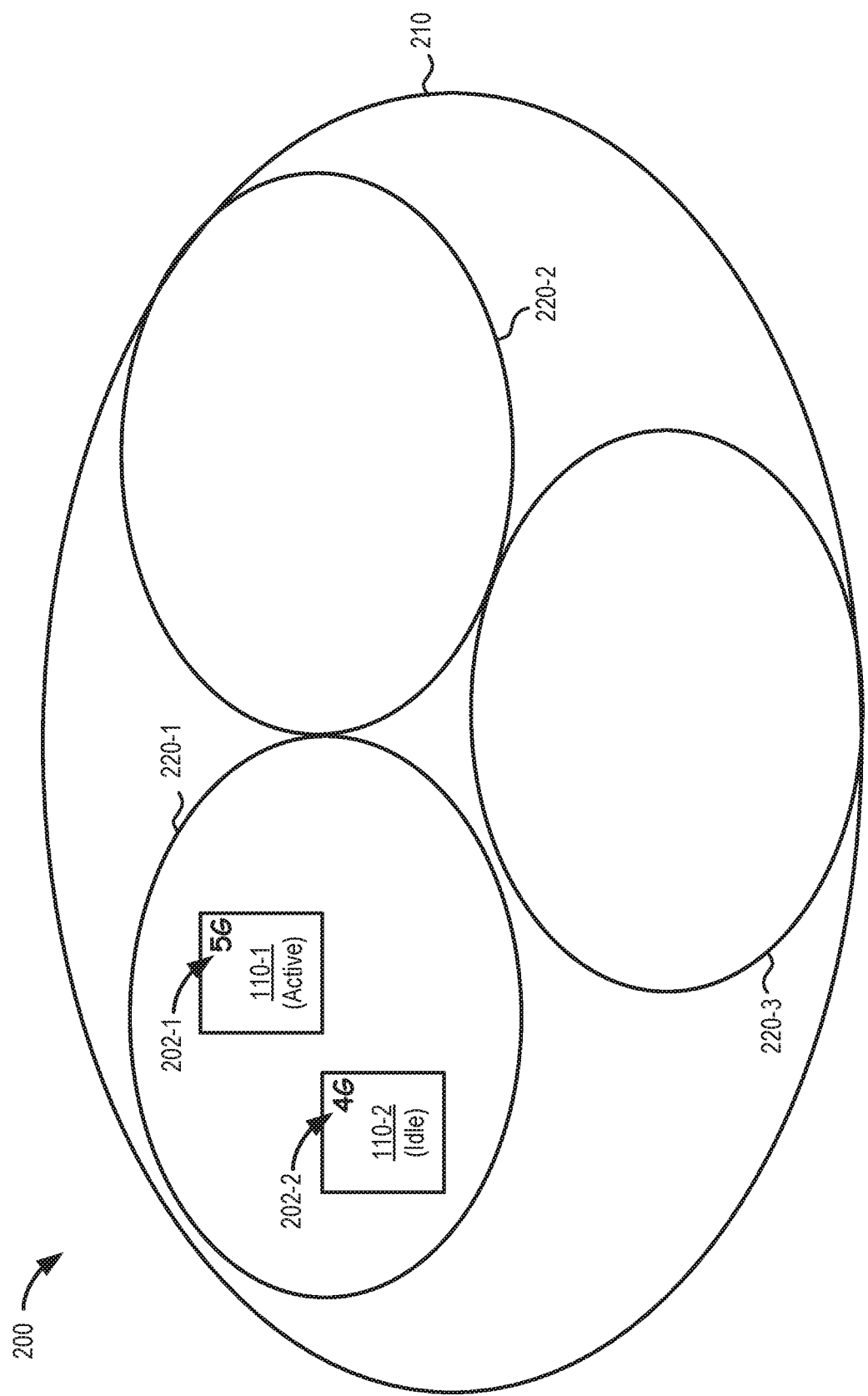
FIGS. 2A-2D are diagrams illustrating exemplary cell coverage areas in a portion of the environment of FIG. 1.

Referring to FIG. 2A, UE device 110-1 and UE device 110-1 may both be located simultaneously within 4G cell 210 and 5G cell 220-1. Assume UE device 110-1 is in an active state connected to 5G cell 220-1, while UE device 110-2 is in an idle state listening via 4G cell 210. UE device 110-1 displays a 5G network icon 202-1 while actively passing data using 5G cell 220-1. UE device 110-2 displays a 4G network icon 202-2 because UE device 110-2 is not connected to 5G cell 220-1. Thus, identical UE devices 110 in the same coverage area at the same time may present different network icons 202. Systems and methods described herein manage the presentation timing of network icons 202 to address user expectations of 5G coverage. As described further herein, a series of timers may be implemented in UE device 110 to extend the presentation of 5G network icon 202-1 in certain situations where 5G coverage is likely even when a UE device 110 is not active on a 5G cell. The series of timers may be implemented, for example, by a processor of UE device 110 (e.g., as part of the operating system) or by a processor in a modem of UE device 110.

Figure 2B:
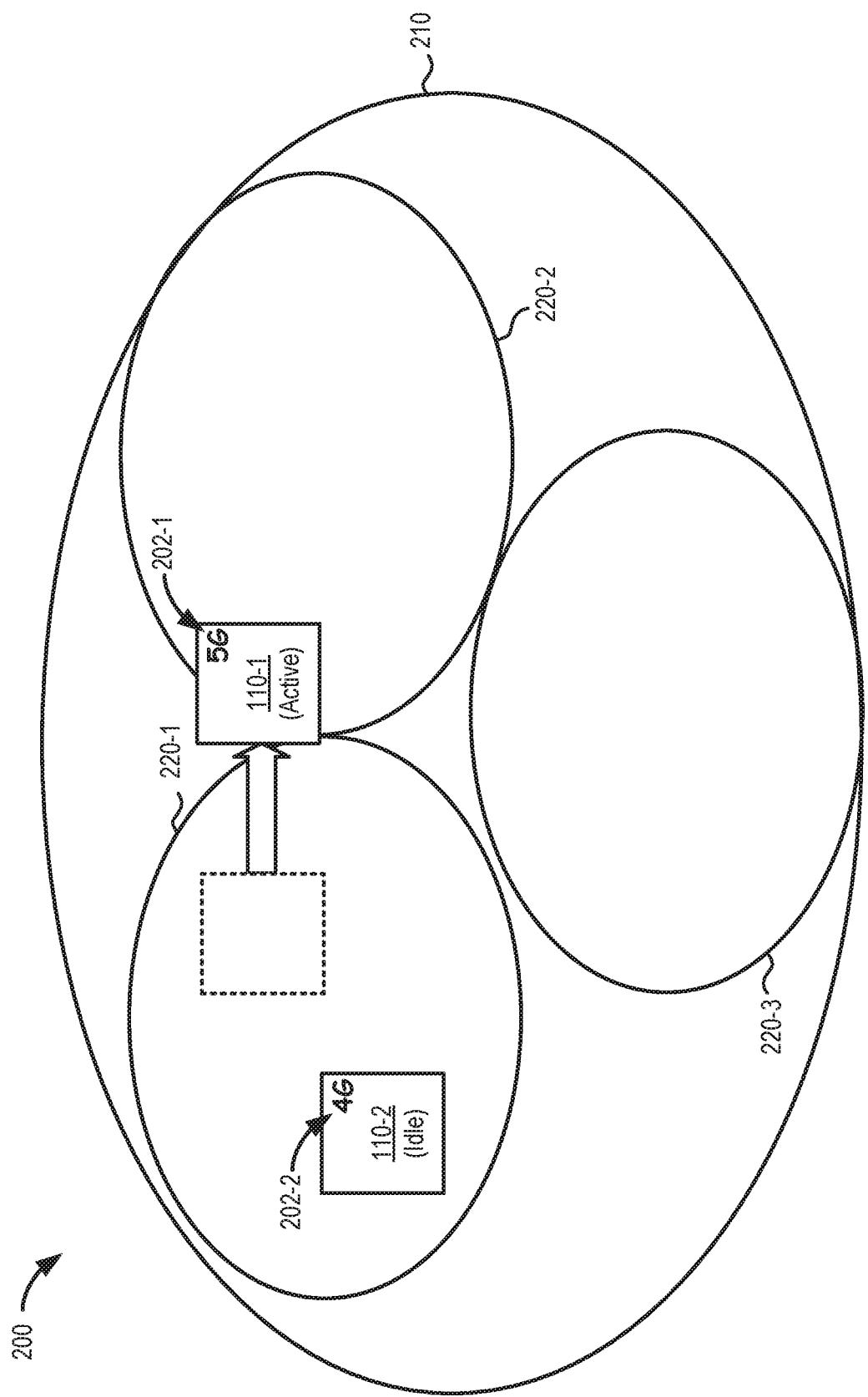

Referring to FIG. 2B, UE device 110-1 may move from 5G cell 220-1 to a non-overlapping 5G cell 220-2, causing a radio link failure with 5G cell 220-1. During a transition from 5G cell 220-1 to 5G cell 220-2, UE device 110-1 may briefly fall back to use 4G cell 210 before establishing a connection with 5G cell 220-2. According to an implementation, UE device 110-1 may implement a no-data timer (T1) to extend the display of 5G icon 202-1 on UE device 110-1 (e.g., for a configurable period, such as 2-4 seconds) to create a perception of consistent 5G coverage and avoid flickering between 5G network icon 202-1 and 4G network icon 202-2.

Figure 2C:
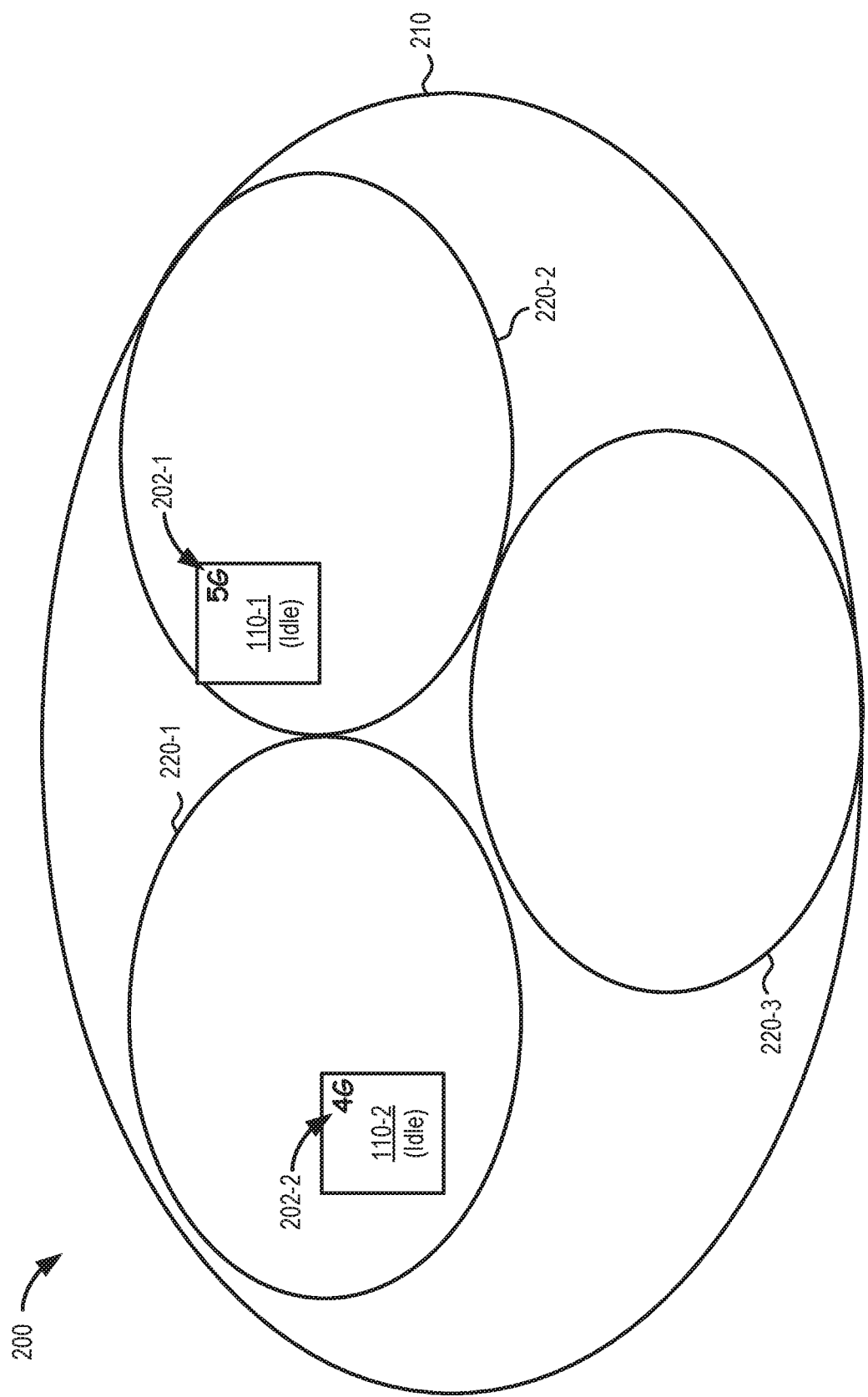

Referring to FIG. 2C, UE device 110-1 may stop actively exchanging data and enter an idle mode while in 5G cell 220-2. According to an implementation, when UE device 110 has previously been using 5G connection prior to entering an idle state, UE device 110-1 may implement an idle mode delay timer (T2) to extend the display of 5G icon 202-1 on UE device 110-1 (e.g., for a configurable period, such as 60 seconds) to indicate consistent 5G coverage.

Figure 2D:
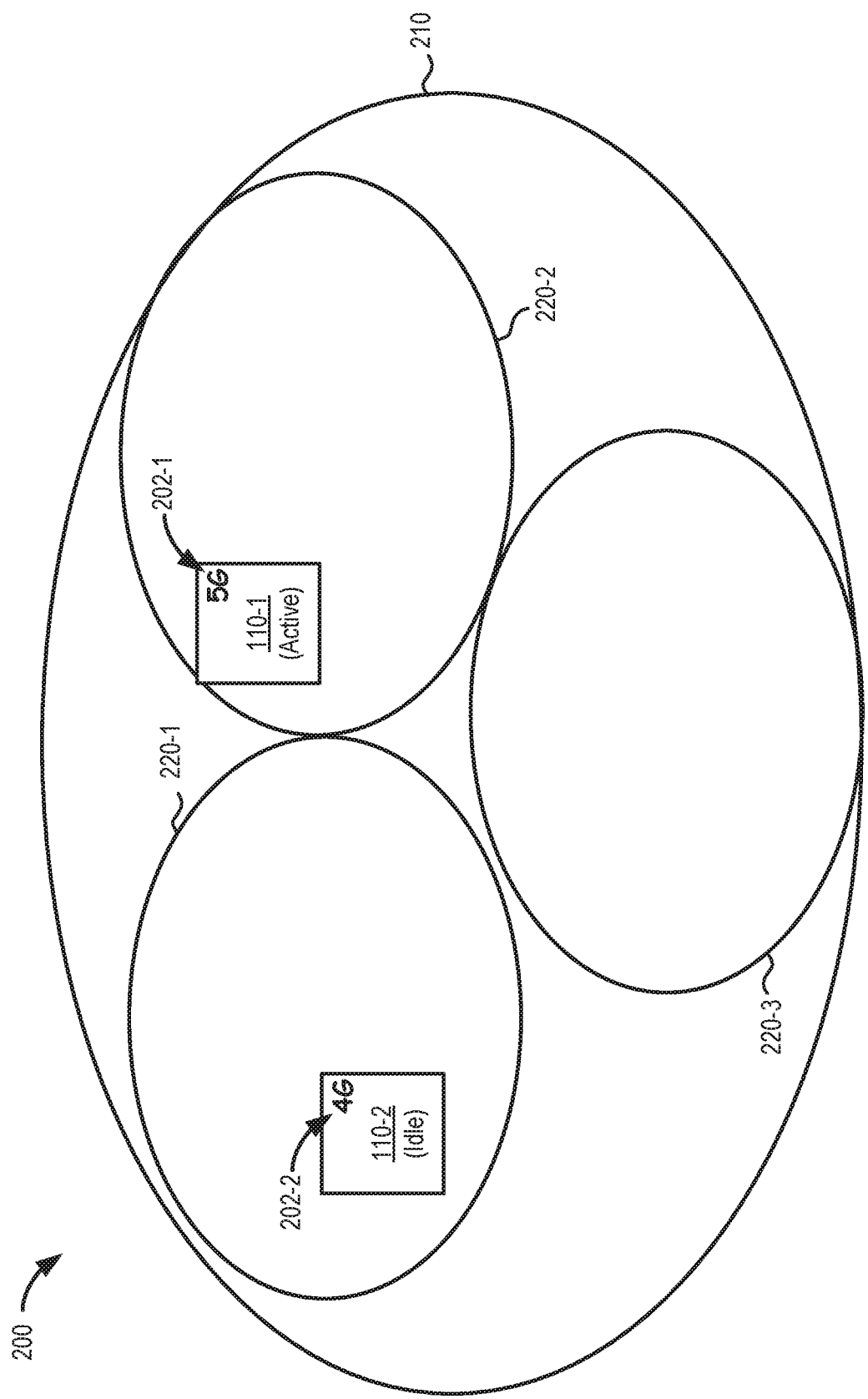

Referring to FIG. 2D, UE device 110-1 may return to an active mode after failing or becoming idle for a short time (e.g., less than the period of idle mode delay timer T2). Upon returning to active mode, the network (e.g., core network 140) will not be immediately aware of the location/coverage for UE device 110-1. Although the initial network default is for UE device 110-1 to start a 4G connection, according to an implementation, UE device 110-1 may implement a location buffer timer (T3) to temporarily display 5G network icon 202-1 (e.g., for a configurable period, such as 1-3 seconds) if the last connection mode before becoming idle was 5G.

Timer T1 will extend the time 5G icon 202-1 will stay enabled, but displaying 5G icon 202-1 could lead to false impressions of 5G coverage if the timer duration (or interval) is long enough to extend to a time period when the device is out of 5G coverage. Timer T2 may be set to hold 5G icon 202-1 on display while UE device 110 is transitioned to idle mode for a set period of time (e.g., 60 seconds)), leaving 5G icon 202-1 displayed if data is transmitted over a 5G connection during the T3 duration, but resetting to 4G icon 202-2 if a 4G connection is utilized. Thus, the icon display on UE device 110 is accurate for active data delivery, while also allowing for 5G icon 202-1 to be persistent for a longer period of time after going to idle. When UE device 110 moves from 5G coverage to an area with only 4G active, wireless station 120-1 (e.g., an eNo- deB) may release the secondary cell group and UE device 110 continues to pass data on the master cell group using 4G. The T1 timer, which could be set to 3 seconds as an example, would start only after the dormancy (or inactivity) timers from 4G and 5G end. As an example, the dormancy timers could be set to 5 seconds for a gNodeB (e.g., wireless station 120-2), and 10 seconds for an eNodeB (e.g., wireless station 120-1).

Although one 4G cell 210 and three 5G cells 220 are shown for simplicity, in practice there may be more 4G cells 210 and different amounts of 5G cells within and outside of each 4G cell 210. Additionally, 4G cells 210 and 5G cells 220 may overlap in any combination and pattern to create areas of contiguous 4G or 5G coverage.

Figure 3:
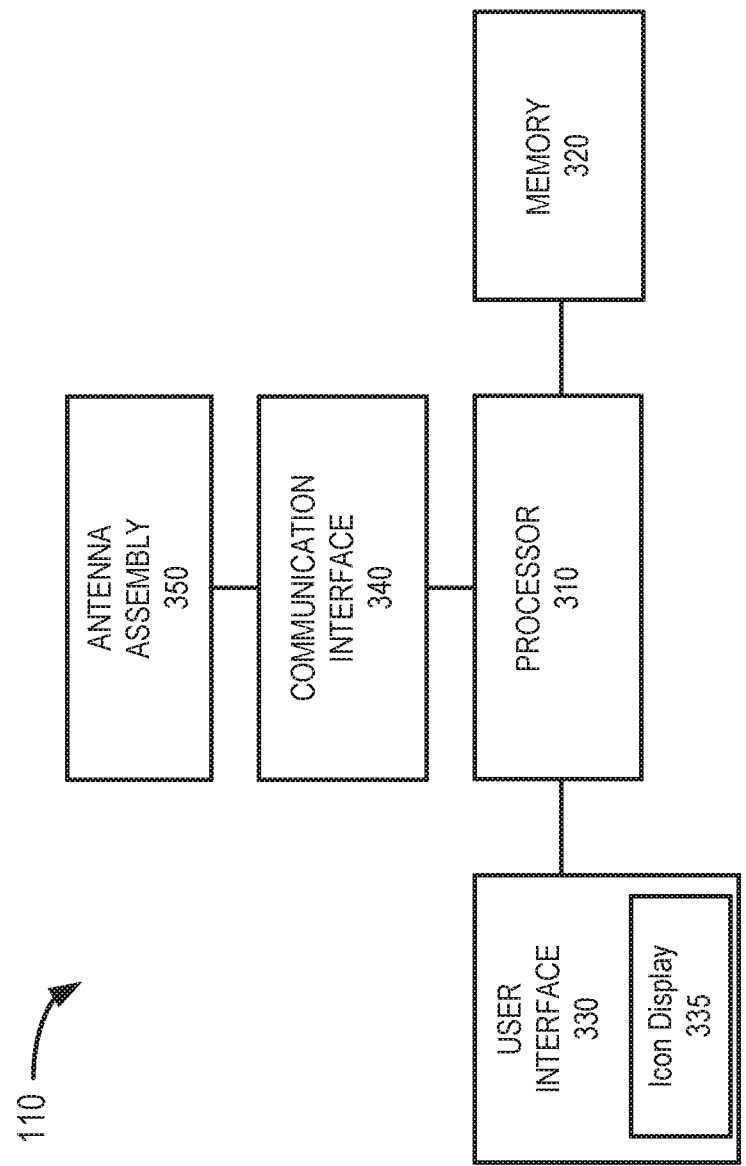
FIG. 3 is a diagram illustrating exemplary components of the user equipment device of FIG. 1.

FIG. 3 is a diagram illustrating exemplary components of a UE device 110 according to an implementation described herein. As shown in FIG. 3, UE device 110 may include a processor 310, a memory 320, a user interface 330, a communication interface 340, and an antenna assembly 350.

Processor 310 may include one or more processors, microprocessors, application specific integrated circuits (ASICs), field programmable gate arrays (FPGAs), and/or other processing logic. Processor 310 may control operation of UE device 110 and its components. According to implementations describe herein, processor 310 may implement instructions to manage icon display timers and present network icons (e.g., network icons 202-1 and 202-2).

Memory 320 may include a random access memory (RAM) or another type of dynamic storage device, a read only memory (ROM) or another type of static storage device, a removable memory card, and/or another type of memory to store data and instructions that may be used by processor 310.

User interface 330 may allow a user to input information to UE device 110 and/or to output information from UE device 110. Examples of user interface 330 may include a speaker to receive electrical signals and output audio signals; a camera to receive image and/or video signals and output electrical signals; a microphone to receive sounds and output electrical signals; buttons (e.g., a joystick, control buttons, a keyboard, or keys of a keypad) and/or a touchscreen to receive control commands; a display to output visual information; an actuator to cause UE device 110 to vibrate; and/or any other type of input or output device. According to an implementation, user interface 330 may include an icon display 335 to selectively present network icons (e.g., network icons 202-1 and 202-2).

Communication interface 340 may include a transceiver that enables UE device 110 to communicate with other devices and/or systems via wireless communications (e.g., radio frequency, infrared, and/or visual optics, etc.), wired communications (e.g., conductive wire, twisted pair cable, coaxial cable, transmission line, fiber optic cable, and/or waveguide, etc.), or a combination of wireless and wired communications. Communication interface 340 may include a transmitter that converts baseband signals to radio frequency (RF) signals and/or a receiver that converts RF signals to baseband signals. Communication interface 340 may be coupled to antenna assembly 350 for transmitting and receiving RF signals.

Communication interface 340 may include a logical component that includes input and/or output ports, input and/or output systems, and/or other input and output components that facilitate the transmission of data to other devices. In an example, communication interface 340 may include a network interface card (e.g., Ethernet card) for wired communications and/or a wireless network interface (e.g., a WiFi)

card for wireless communications. Communication interface 340 may also include a universal serial bus (USB) port for communications over a cable, a Bluetooth™ wireless interface, a radio-frequency identification (RFID) interface, a near-field communications (NFC) wireless interface, and/or any other type of interface that converts data from one form to another form.

Antenna assembly 350 may include one or more antennas to transmit and/or receive RF signals. Antenna assembly 350 may, for example, receive RF signals from communication interface 340 and transmit the signals and receive RF signals and provide them to communication interface 340.

As described herein, UE device 110 may perform certain operations in response to processor 310 executing software instructions contained in a computer-readable medium, such as memory 320. A computer-readable medium may be defined as a non-transitory memory device. A non-transitory memory device may include memory space within a single physical memory device or spread across multiple physical memory devices. The software instructions may be read into memory 320 from another computer-readable medium or from another device via communication interface 340. The software instructions contained in memory 320 may cause processor 310 to perform processes that will be described later. For example, memory 320 may store instructions used by processor 310 to manage icon display timers and present network icons (e.g., network icons 202-1 and 202-2). Alternatively, hardwired circuitry may be used in place of, or in combination with, software instructions to implement processes described herein. Thus, implementations described herein are not limited to any specific combination of hardware circuitry and software.

Although FIG. 3 shows example components of UE device 110, in other implementations, UE device 110 may include fewer components, different components, differently arranged components, or additional components than depicted in FIG. 3. Additionally or alternatively, one or more components of UE device 110 may perform the tasks described as being performed by one or more other components of UE device 110.

Figure 4:
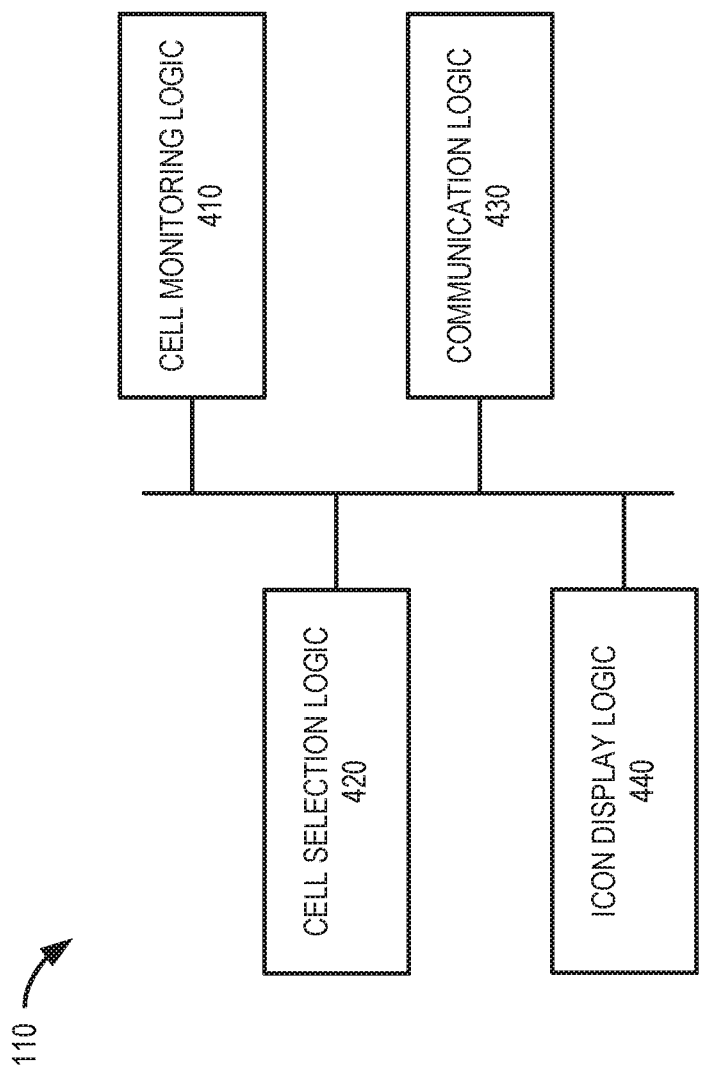
FIG. 4 illustrates an exemplary configuration of logic components implemented in the user equipment device of FIG. 1.

FIG. 4 is an exemplary functional block diagram of components implemented in UE device 110. In an exemplary implementation, all or some of the components illustrated in FIG. 4 may be implemented by processor 310 executing software instructions stored in memory 320. In other implementations, all or some of the components illustrated in FIG. 4 may be implemented in hardware or a combination of hardware, firmware and software used to perform the functionality described below.

UE 110 may include cell monitoring logic 410, cell selection logic 420, communication logic 430, and icon display logic 440. In alternative implementations, these components or a portion of these components may be located externally with respect to UE device 110. For example, a wireless station 120 or a network device 150 in core network 140 may include logic to assist components in FIG. 4.

Cell monitoring logic 410 may include logic to measure and/or monitor the signal strengths associated with particular cells (e.g., 4G cell 210 and 5G cells 220). For example, UE devices 110 illustrated in FIG. 2A may measure the strength of communication signals from wireless stations 120 associated with cells 210 and 220.

Cell selection logic 420 may include logic to select a cell, such as an anchor cell (e.g., 4G cell 210) or non-anchor cell (e.g., one of 5G cells 220) in environment 100. For example, UE 110-1 illustrated in FIG. 2A may establish communications with a wireless station 120 associated with cell 210 (e.g., an anchor cell in this example) to facilitate communications via a 5G NR cell, such as cell 220-1. For example, selecting a cell which corresponds to an anchor cell may allow that anchor cell to handoff communications to a gNodeB or other device associated with communications via 5G NR cell 220-1 when UE 110 is located within an area defined by 5G NR cell 220-1.

Communication logic 430 may include logic to communicate with elements in environment 100 directly or indirectly. For example, communication logic 430 may transmit and receive communications associated with establishing a radio resource control (RRC) connection with the appropriate wireless stations 120 in environment 100, such as an eNodeB (e.g., wireless station 120-1) associated with a 4G cell (e.g., a 4G cell 210). Communication logic 430 may also transmit and receive communications associated with establishing a connection with a gNodeB (e.g., wireless station 120-2) associated with a 5G NR cell (e.g., a 5G cell 220).

Icon display logic 440 may include logic to implement display of network icons (e.g., network icons 202) on UE device 110. For example, icon display logic 440 may implement timers (e.g., T1, T2, T3) to give the indication and/or perception of 5G coverage under certain conditions, as described herein. Icon display logic 440 is described further in connection with FIGS. 5A and 5B.

Although FIG. 4 shows exemplary components of UE device 110, in other implementations, UE device 110 may include fewer components, different components, differently arranged components, or additional components than depicted in FIG. 4. In addition, functions described as being performed by one of the components in FIG. 4 may alternatively be performed by another one or more of the components of UE device 110.

Figure 5A:
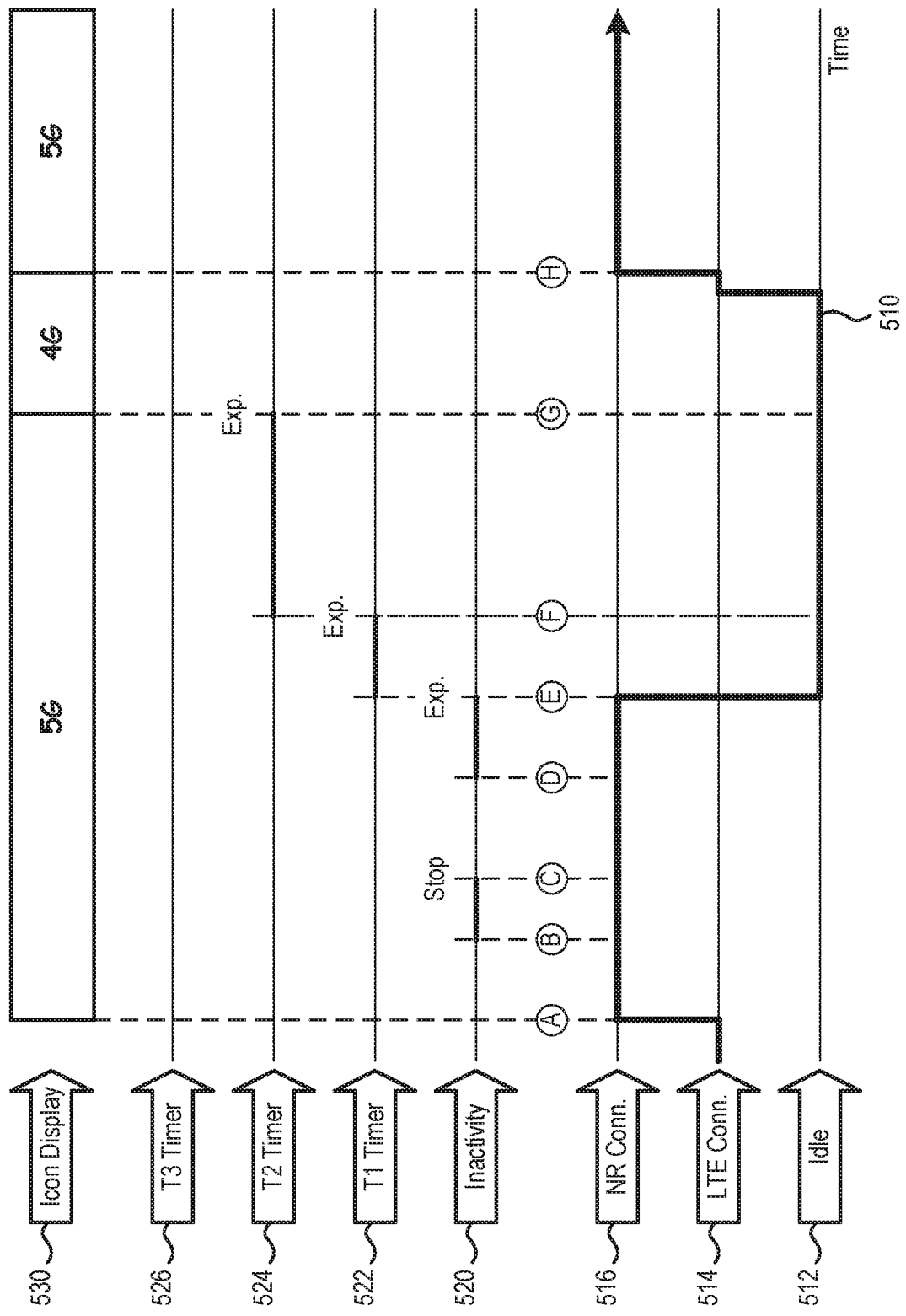
FIGS. 5A and 5B are a state diagrams illustrating connection states and corresponding icon presentations of the user equipment device of FIG. 1, according to implementations described herein.
Figure 5B:
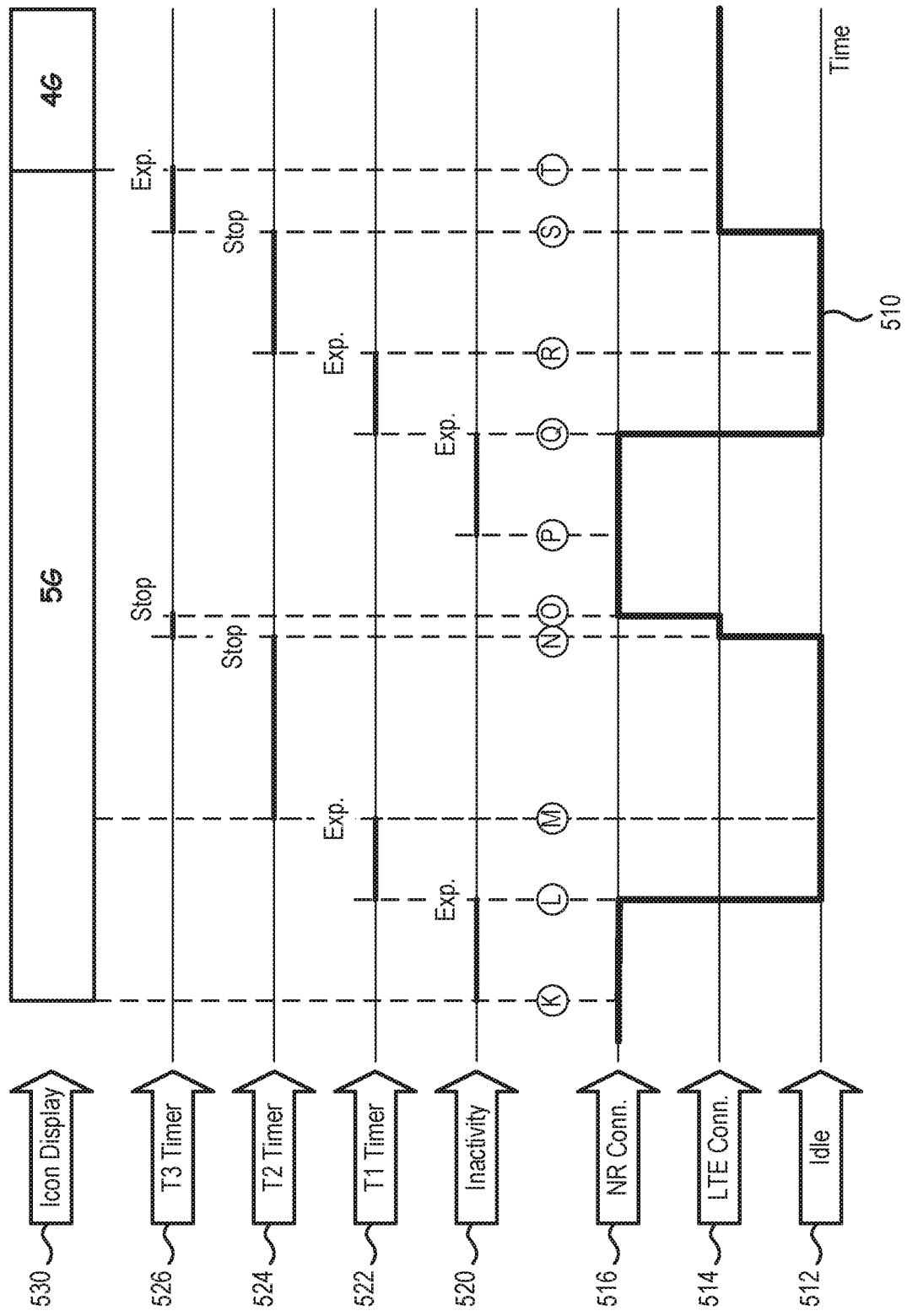

FIGS. 5A and 5B are a state diagrams illustrating connection states and corresponding icon presentations of UE device 110 over time. In one implementation, the icon presentations may be implemented by icon display logic 440 operating on processor 310 or a modem (e.g., communication interface 340) of UE device 110.

In FIGS. 5A and 5B, a connection 510 of UE device 110 is mapped over a series of events "A" through "T." Connections states of UE device 110 may include an idle state 512, an LTE connected state 514, and a 5G NR connected state 516. LTE connected state 514 may correspond to an active 4G connection with wireless station 120-1 (e.g., an eNB). NR connected state 516 may correspond to an active 5G connection with wireless station 120-2 (e.g., a gNB). Multiple timers, shown as inactivity timer 520, T1 timer 522 (e.g., a no-data timer), T2 timer 524 (e.g., an idle mode delay timer), and T3 timer 526 (e.g., a location buffer timer), may be implemented in response to certain events A-T, as described herein. Inactivity timer 520, T1 timer 522, T2 timer 524, and T3 timer 526 may regulate the presentation of icon display 530 for UE device 110. Icon display 530 may correspond to the presentation of network icon 202-1 ("5G") or network icon 202-2 ("4G") on UE device 110. The durations shown for connection states, timers, and displays in FIGS. 5A and 5B are illustrative and not to scale.

According to an implementation, T1 timer 522, T2 timer 524, and T3 timer 526 may be configurable (e.g., by a network administrator). In one aspect, T1 timer 522 may have a relatively short time period (e.g., between 0-5 seconds, such as about 3 seconds) sufficient to cover a short interruption in 5G network coverage. T2 timer 524 may have a longer duration than T1 timer 522 (e.g., about 30 to 90 seconds, such as about 60 seconds) to provide a user a realistic perception of 5G coverage when UE device 110 has previously been using a 5G connection prior to entering an idle state. T3 timer 526 may have a relatively short time period (e.g., less than the duration of T2 timer 524, or less than about 5 seconds, such as about 2-4 seconds) sufficient to allow UE device 110 to determine if a secondary cell group is still available after reconnecting from an idle state.

The timer durations described herein are provided for purposes of illustration, and other timer durations for inactivity timer 520, T1 timer 522, T2 timer 524, and T3 timer 526 may be used. For example, as the amount of 5G cells 220 increases, along with customer expectations for 5G coverage, it may be preferable to shorten or extend one or more of the timer durations for T1 timer 522, T2 timer 524, or T3 timer 526. Thus, in another exemplary implementation, the duration of T2 timer 524 may be several minutes or more. As such, implementations described herein are not limited to specified timer durations.

Referring to FIG. 5A, at event A, UE device 110 with an active 4G connection may begin in LTE connected state 514, enter a 5G cell (e.g., 5G cell 220-1) and download data. UE device 110 will detect 5G coverage and switch to NR connected state 516. UE device 110 may cause icon display 530 to present the 5G icon (e.g., network icon 202-1) to a user. At event B, UE device 110 stops downloading, and inactivity timer 520 starts. Inactivity timer 520 may include one or more time values for 4G or 5G network inactivity. For example, inactivity timer 520 may be 5 seconds for 5G connections and 10 seconds for 4G connections. At event C, before inactivity timer 520 expires, UE device 110 again starts downloading, which stops inactivity timer 520.

At event D, UE device 110 again stops downloading, and inactivity timer 520 re-starts. Assume UE device 110 remains inactive until inactivity timer 520 expires at event E. Thus, at event E, UE device 110 enters idle state 512, bringing down or ending the 5G connection and LTE connection. At this point (beginning at event E), the location of UE device 110 may be unknown to wireless stations 120, and UE device 110 starts T1 timer 522.

Assume that UE device 110 remains in idle state 512 through the expiration of T1 timer 522 at event F. The location and network coverage for UE device 110 at event F remains unknown to wireless stations 120, and UE device 110 starts T2 timer 524. Assume that UE device 110 continues in idle state 512 through the expiration of T2 timer 524 at event G. UE device 110 may cause icon display 530 to continuously present the 5G icon (e.g., network icon 202-1) between events A-G, even though UE device 110 is in idle state 512 for some of that period.

At event G, when T2 timer 524 expires, UE device 110 may cause icon display 530 to switch to present the 4G icon (e.g., network icon 202-2) to a user. That is, UE device 110 has been in idle state 512 (without a known location/coverage) for a significant time period (e.g., over a minute), and 5G coverage from the previous active connection is no longer presumed.

Assume that, prior to event H, UE device 110 resumes an active connection while in a 5G cell (e.g., 5G cell 220-2). Thus, after a brief 4G connection, UE device 110 returns to NR connected state 516. UE device 110 may cause icon display 530 to continuously present the 4G icon (e.g., network icon 202-2) between events G and H. At event H, UE device 110 may cause icon display 530 to switch to present the 5G icon (e.g., network icon 202-1).

Referring to FIG. 5B, assume at event K, that UE device 110 stops downloading, and inactivity timer 520 re-starts. Assume UE device 110 remains inactive until inactivity timer 520 expires at event L. Thus, at event L, UE device 110 enters idle state 512, again bringing down or ending the 5G connection and LTE connection. At this point (beginning at event L), the location of UE device 110 may be unknown to wireless stations 120, and UE device 110 starts T1 timer 522. Assume UE device 110 remains in idle state 512 through the expiration of T1 timer 522 at event M. The location and network coverage for UE device 110 at event M remains unknown to wireless stations 120, and UE device 110 again starts T2 timer 524.

At event N, UE device 110 resumes active connection before the expiration of timer T2, switching from idle state 512 to LTE connected state 514 at an initially unknown location. T3 timer is initiated to allow time to determine if UE device 110 is still in a 5G cell. Assume that at event 0, UE device 110 connects to a 5G cell (e.g., 5G cell 220-2) before the expiration of T3 timer and enters NR connected state 516. UE device 110 causes icon display 530 to continuously present the 5G icon (e.g., network icon 202-1) between events K-O, even though UE device 110 is in idle state 512 and LTE connected state 514 for some of that period.

At event P, UE device 110 again stops downloading, and inactivity timer 520 again starts. Assume UE device 110 remains inactive until inactivity timer 520 expires at event Q. Thus, at event Q, UE device 110 enters idle state 512, bringing down the 5G connection and LTE connection. At this point (beginning at event Q), the location of UE device 110 may again be unknown to wireless stations 120, and UE device 110 starts T1 timer 522. Assume that UE device 110 remains in idle state 512 through the expiration of T1 timer 522 at event R. The location and network coverage for UE device 110 at event R remains unknown to wireless stations 120, and UE device 110 starts T2 timer 524.

At event S, UE device 110 resumes active connection before the expiration of timer T2, switching from idle state 512 to LTE connected state 514 at an initially unknown location. T3 timer is initiated to allow time to determine if UE device 110 is still in a 5G cell. Assume that at event T, T3 timer expires before UE device 110 connects to a 5G cell (that is, UE device 110 remains in an active 4G connection). Thus, UE device 110 may cause icon display 530 to continuously present the 5G icon (e.g., network icon 202-1) from event K up to event T, before switching to a 4G icon at event T (e.g., network icon 202-2).

Although FIGS. 5A-5B illustrate some connection states and corresponding icon presentations of UE device 110, not every connection state and corresponding icon presentation scenario is shown in FIGS. 5A-5B. Other connection states and corresponding icon presentations of UE device 110 are not shown for simplicity.

Figure 6:
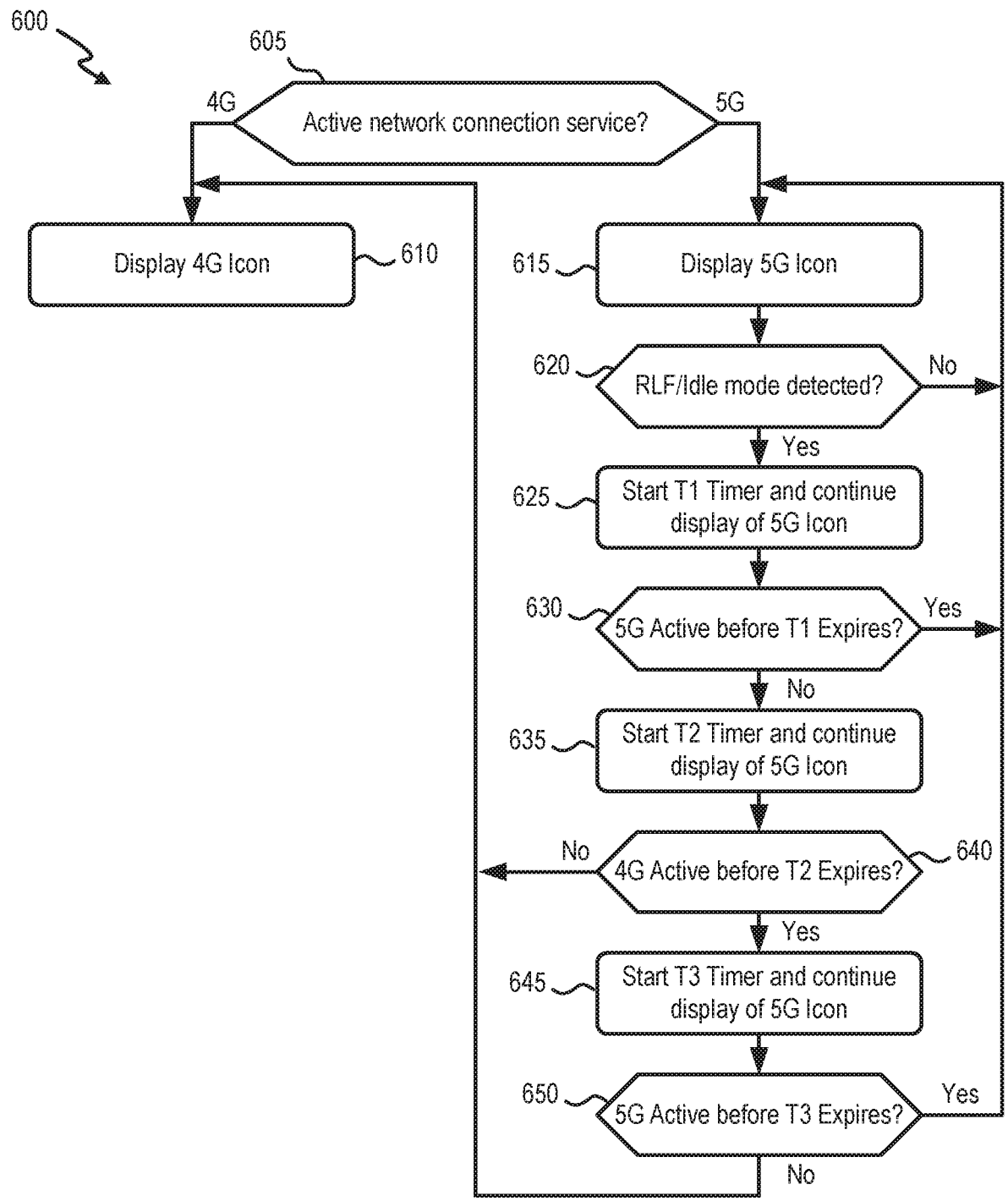
FIG. 6 is a flow diagram illustrating an exemplary process for indicating coverage types for user devices in dual connectivity wireless networks, according to an implementation described herein.

FIG. 6 is a flow diagram illustrating an exemplary process 600 for indicating coverage types for user devices in dual connectivity wireless networks, according to an implementation described herein. In one implementation, process 600 may be implemented UE device 110. In another implementation, process 600 may be implemented by UE device 110 in conjunction with one or more other devices in network environment 100.

Referring to FIG. 6, process 600 may include detecting if an active network connection provides 4G or 5G service (block 605). For example, UE device 110 may connect to an LTE network (e.g., a master cell group for a non-standalone wireless network) and, if available, may establish a connection to one or more secondary cell groups that provide 5G NR service.

If the active network connection provides only 4G service (block 605—4G), process 600 may include displaying a 4G icon (block 610). For example, if UE device 110 is not connected to a secondary cell group, UE device 110 may present a MCG-related network icon (e.g., 4G network icon 202-2). If the active network connection provides 5G service (block 605—5G), process 600 may include displaying a 5G icon (block 615). For example, if UE device 110 is connected to a secondary cell group, UE device 110 may present a SCG-related network icon (e.g., 5G network icon 202-1).

Process 600 may further include determining if there is a radio link failure (RLF) or idle mode is entered from 5G coverage (block 620). For example, UE device 110 may detect a loss of signal from both a master cell group and secondary cell group. Alternatively, UE device 110 may enter idle mode after expiration of an inactivity timer.

If there is no radio link failure or an idle mode is not entered (block 620—No), process 600 may include continuing to display the 5G icon (block 615). If there is a radio link failure or idle mode is entered (block 620—Yes), process 600 may include starting a T1 timer and continuing to display the 5G icon (block 625). For example, UE device 110 may initiate T1 timer 522 when a connection to the secondary cell group is lost.

Process 600 may further include determining if a 5G connection becomes active before the T1 timer expires (block 630). For example, UE device 110 may determine if there is a reconnection (e.g., to the master cell group or secondary cell group) or if UE device 110 continues in an idle mode. If a 5G connection becomes active before the T1 timer expires (block 630—Yes), process 600 may include continuing to display the 5G icon (block 615). If a 5G connection does not become active before the T1 timer expires (block 630—No), process 600 may include starting a T2 timer and continuing to display the 5G icon (block 635). For example, UE device 110 may initiate T2 timer 524 when the T1 timer expires while UE device 110 is in an idle state.

Process 600 may further include determining if a 4G connection becomes active before the T2 timer expires (block 640). For example, UE device 110 may determine if there is a reconnection (e.g., to the master cell group) or if UE device 110 continues in an idle mode for the duration of the T2 timer. If UE device 110 does not reconnect before the T2 timer expires (block 640—No), process 600 may include displaying a 4G icon (block 610). For example, if UE device 110 remains in an idle state past the expiration of T2 timer 524, UE device 110 may switch from a 5G icon display 202-1 to a 4G icon display 202-2. If UE device 110 reconnects before the T2 timer expires (block 640—Yes), process 600 may include starting a T3 timer and continuing to display the 5G icon (block 645). For example, UE device 110 may initiate T3 timer 526 when UE device 110 reconnects from an idle state after previously having a 5G connection.

Process 600 may further include determining that UE device 110 establishes a 5G connection before the T3 timer expires (block 650). For example, after an initial connection to a 4G network (e.g., a master cell group), UE device 110 may connect to a 5G network (e.g., a secondary cell group) when in an appropriate coverage area. If UE device 110 does not connect to the 5G network before the T3 timer expires (block 650—No), process 600 may include displaying a 4G icon (block 610). For example, if UE device 110 remains connected to only the master cell group past the expiration of T3 timer 526, UE device 110 may switch from a 5G icon display to a 4G icon display. If UE device 110 establishes a 5G connection before the T3 timer expires (block 650—Yes), process 600 may include continuing to display the 5G icon (block 615). For example, UE device 110 may present a SCG-related network icon (e.g., 5G network icon 202-1) continuously through the idle period that expires prior to the duration of the T3 timer.

The foregoing description of implementations provides illustration and description, but is not intended to be exhaustive or to limit the invention to the precise form disclosed. Modifications and variations are possible in light of the above teachings or may be acquired from practice of the invention. For example, in other implementations, T1 timer 524 may be eliminated. Also, while a series of blocks have been described with regard to FIG. 6, the order of the blocks and message/operation flows may be modified in other embodiments. Further, non-dependent blocks may be performed in parallel.

Certain features described above may be implemented as "logic" or a "unit" that performs one or more functions. This logic or unit may include hardware, such as one or more processors, microprocessors, application specific integrated circuits, or field programmable gate arrays, software, or a combination of hardware and software.

To the extent the aforementioned embodiments collect, store or employ personal information of individuals, it should be understood that such information shall be collected, stored and used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

All structural and functional equivalents to the elements of the various aspects set forth in this disclosure that are known or later come to be known to those of ordinary skill in the art are expressly incorporated herein by reference and are intended to be encompassed by the claims. No claim element of a claim is to be interpreted under 35 U.S.C. § 112(f) unless the claim element expressly includes the phrase "means for" or "step for."

What is claimed is:

1. A user device comprising:
    a communication interface;
    a memory storing instructions; and
    one or more processors configured to execute the instructions to:
        establish a connection to one or more secondary cell groups (SCGs) in a wireless network;
        present, in response to the establishing, a SCG-related network icon on the user device;
        detect inactivity on the connection to the one or more SCGs;
        initiate a first timer, based on the detecting, while continuing to present the SCG-related network icon;
        initiate a second timer, while continuing to present the SCG-related network icon, if the first timer expires while the user device is in an idle state;
        detect, before expiration of the second timer, an active connection with a master cell group (MCG);
        initiate a third timer in response to detecting the active connection with the MCG and while continuing to present the SCG-related network icon; and
        switch presentation of the SCG-related network icon to presentation of a MCG-related network icon when the third timer expires and the user device is not connected to one of the SCGs.

2. The user device of claim 1, wherein detecting the inactivity includes detecting a radio link failure with the SCG or expiration of a network inactivity timer.

3. The user device of claim 1, wherein one or more of the first timer, the second timer, and third timer have configurable intervals.

4. The user device of claim 1, wherein the second timer includes a second configurable time interval that is larger than a first configurable time interval of the first timer.

5. The user device of claim 4, wherein the third timer includes a third configurable time interval that is less than the second configurable time interval.

6. The user device of claim 1, wherein the SCG includes a next generation Node B using millimeter wave (mmWave) radio frequencies.

7. The user device of claim 1, wherein the MCG includes a wireless station for a Long Term Evolution network.

8. The user device of claim 1, wherein the one or more processors are further configured to execute the instructions to:
    switch presentation of the SCG-related network icon to presentation of the MCG-related network icon when the second timer expires while the user device is in the idle state.

9. The user device of claim 1, wherein at least one of the one or more processors in included in a modem of the user device.

10. The system of claim 1, wherein at least one of the one or more processors further executes an operating system of the user device.

11. A method performed by a user device, the method comprising:
    establishing a connection to one or more secondary cell groups (SCGs) in a wireless network;
    presenting, in response to the establishing, a SCG-related network icon on the user device;
    detecting inactivity on the connection to the one or more SCGs;
    initiating a first timer, based on the detecting, while continuing to present the SCG-related network icon;
    initiating a second timer, while continuing to present the SCG-related network icon, if the first timer expires while the user device is in an idle state;
    detecting, before expiration of the second timer, an active connection with a master cell group (MCG);
    initiating a third timer in response to detecting the active connection with the MCG and while continuing to present the SCG-related network icon; and
    switching presentation of the SCG-related network icon to presentation of a MCG network icon when the third timer expires and the user device is not connected to one of the SCGs.

12. The method of claim 11, wherein detecting the inactivity includes detecting a radio link failure with the SCG or expiration of a network inactivity timer.

13. The method of claim 11, wherein the second timer includes a configurable time interval of more than about 60 seconds, and wherein the third timer includes a configurable time interval of between about 0 to about 4 seconds.

14. The method of claim 11, wherein the first timer includes a configurable time interval of at least about 3 seconds.

15. The method of claim 11, wherein the SCG includes a next generation Node B using millimeter wave (mmWave) radio frequencies.

16. The method of claim 11, wherein the MCG includes a wireless station for a Long Term Evolution network.

17. The method of claim 11, further comprising:
    switching presentation of the SCG-related network icon to presentation of the MCG-related network icon when the second timer expires while the user device is in the idle state.

18. A non-transitory, computer-readable storage media storing instructions executable by one or more processors of a user device, which when executed cause the user device to:
    establish a connection to one or more secondary cell groups (SCGs) in a wireless network;
    present, in response to the establishing, a SCG-related network icon on the user device;
    detect inactivity on the connection to the one or more SCGs;
    initiate a first timer, based on the detecting, while continuing to present the SCG-related network icon;
    initiate a second timer, while continuing to present the SCG-related network icon, if the first timer expires while the user device is in an idle state;
    detect, before expiration of the second timer, an active connection with a master cell group (MCG);
    initiate a third timer in response to detecting the active connection with the MCG and while continuing to present the SCG-related network icon; and
    switch presentation of the SCG-related network icon to presentation of a MCG-related network icon when the third timer expires and the user device is not connected to one of the SCGs.

19. The non-transitory, computer-readable storage media of claim 18, wherein the MCG includes a wireless station for a Long Term Evolution network, and wherein the SCG includes a next generation Node B using millimeter wave (mmWave) radio frequencies.

20. The non-transitory, computer-readable storage media of claim 19, wherein the instructions, when executed, further cause the user device to:

switch presentation of the SCG-related network icon to presentation of the MCG-related network icon when the second timer expires while the user device is in the idle state.

\* \* \* \* \*